(12) United States Patent
Talaric et al.

(10) Patent No.: US 6,659,315 B2
(45) Date of Patent: Dec. 9, 2003

(54) MANIKIN JOINTS

(75) Inventors: James Talaric, Louisville, CO (US);
James Barber, Longmont, CO (US);
Richard Varner, Longmont, CO (US)

(73) Assignee: Fusion Specialties, Inc., Broomfield, CO (US)

( * ) Notice: Subject to any disclaimer, the term of this patent is extended or adjusted under 35 U.S.C. 154(b) by 0 days.

(21) Appl. No.: 09/961,792

(22) Filed: Sep. 24, 2001

(65) Prior Publication Data

US 2003/0059249 A1 Mar. 27, 2003

(51) Int. Cl.$^7$ .............. A41H 5/00; A63H 3/46; F16C 11/00
(52) U.S. Cl. .......... 223/66; 223/68; 223/120; 446/375; 446/376; 446/378; 403/52; 403/150; 403/152; 403/154
(58) Field of Search .............. 223/66, 68, 120; 434/267, 274–275; 446/119, 376, 375, 377, 378, 383; 403/52, 53, 54, 57, 150, 152, 154, 157; 623/31, 39, 59, 53, 61, 43, 48, 47, 20.12, 20.13, 20.24, 20.25

(56) References Cited

U.S. PATENT DOCUMENTS

| | | | |
|---|---|---|---|
| 982,096 A | 1/1911 | Schoenhut | |
| 1,695,829 A | * 12/1928 | Taudvin | ............ 403/61 |
| 3,934,804 A | 1/1976 | Bruce | |
| 4,075,782 A | 2/1978 | Neuschatz | |
| 4,186,518 A | 2/1980 | Luke | |
| 4,466,800 A | 8/1984 | Breiden | |
| 4,545,514 A | 10/1985 | Toy | |
| 4,630,762 A | 12/1986 | Stringer | |
| 4,955,844 A | 9/1990 | Miller, Jr. | |
| 4,958,643 A | 9/1990 | Pansiera | |
| 5,018,977 A | 5/1991 | Wiley et al. | |
| 5,044,960 A | 9/1991 | De Porteous | |
| 5,098,213 A | 3/1992 | Day | |
| 5,152,692 A | 10/1992 | Richards | |
| 5,180,086 A | 1/1993 | Ikeda | |
| 5,257,873 A | 11/1993 | Abbat | |
| 5,259,765 A | 11/1993 | Richards | |
| 5,265,779 A | 11/1993 | Jiang | |
| 5,308,276 A | 5/1994 | Fogarty et al. | |
| 5,318,469 A | 6/1994 | Unalp et al. | |
| 5,318,471 A | 6/1994 | Glovier | |
| 5,443,188 A | 8/1995 | Kotlarsky et al. | |
| 5,967,790 A | 10/1999 | Strover et al. | |
| 6,024,261 A | * 2/2000 | Tseng | ............ 223/66 |

* cited by examiner

*Primary Examiner*—Lynne H. Browne
*Assistant Examiner*—G M Collins
(74) *Attorney, Agent, or Firm*—Greenlee, Winner and Sullivan, P.C.

(57) ABSTRACT

Joints for joining together limb members of mannequins and forms, and methods of assembly of joints and mannequins are provided. The joints and mannequins of this invention provide natural anatomical shape and ease of assembly. This is accomplished using one or more assembly fixtures, located within or on a limb member to be joined, that contain elements of a locking mechanism to hold the limbs together and other elements for creating tension or friction between joined limb members. The assembly fixtures also comprise a disc (or tab) that provides a natural appearance to the joint and allows for ease of assembly.

22 Claims, 9 Drawing Sheets

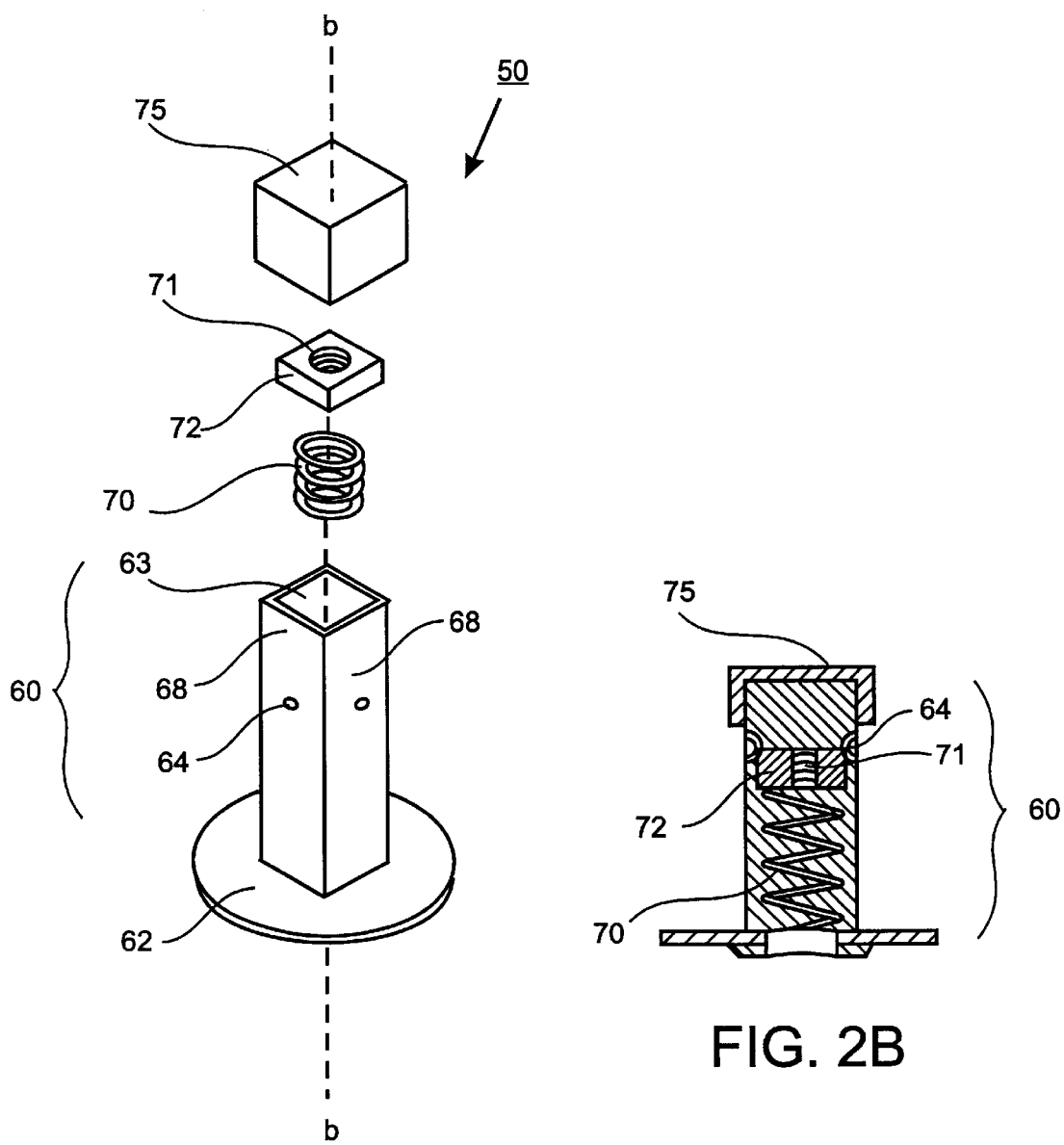
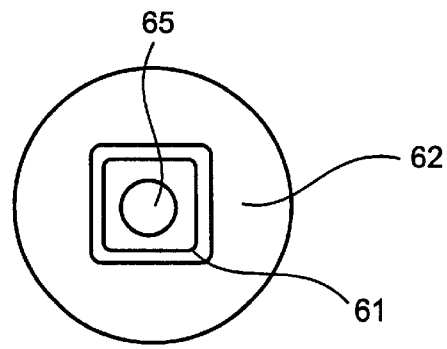
FIG. 2B
FIG. 2A
FIG. 2C

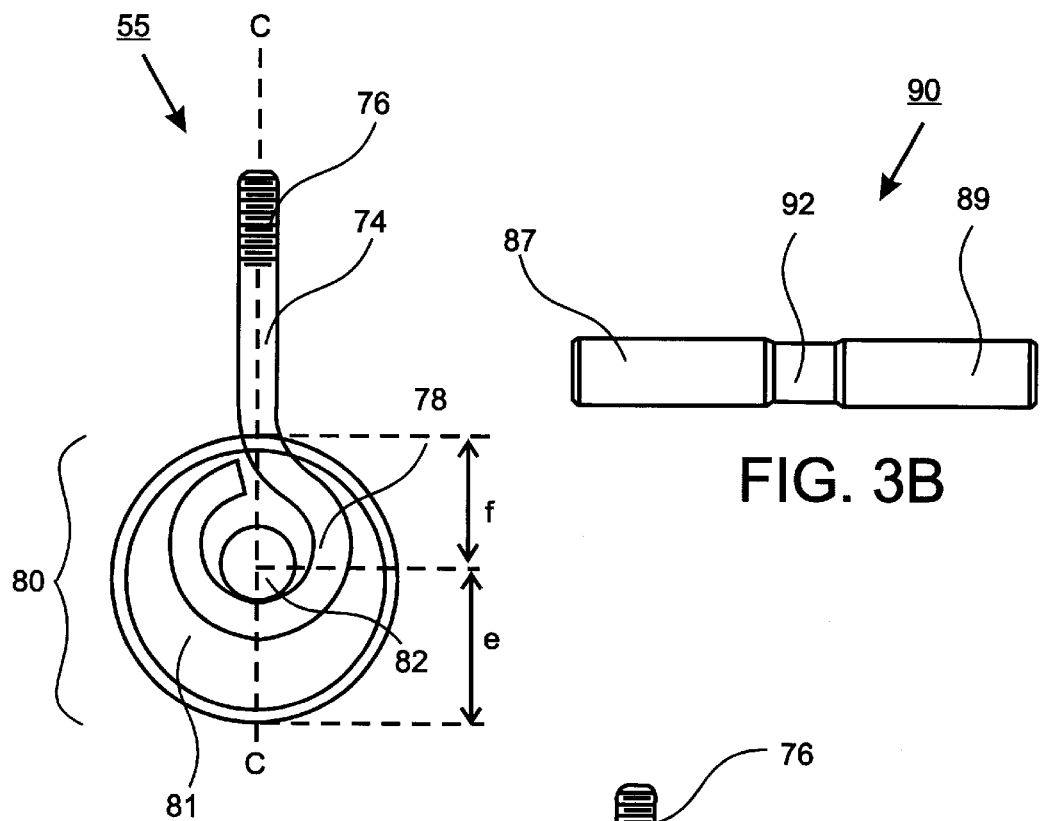
FIG. 3A
FIG. 3B
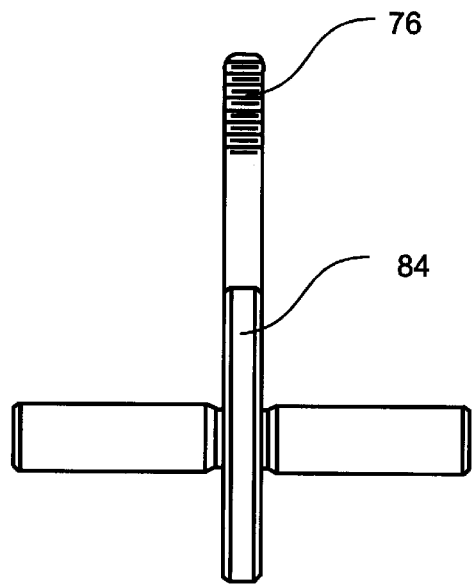
FIG. 3C

MANIKIN JOINTS

BACKGROUND

Forms or mannequins that are models of the human body are well known in the art and are used to display clothing and other merchandise. Such forms and mannequins are often complete or partial human bodies and often are of life-sized proportions. "Forms" typically refers to human and/or animal shapes with or without heads, and without appendages or limbs. "Mannequins" or "manikins" typically refers to human and/or animal shapes with or without heads, and with some or all appendages. The terms "form" and "mannequin" are used interchangeably herein, and each term incorporates the other. Dressing mannequins can be difficult if limbs are not removable. Removable limbs should be both simple in construction and life-like in appearance. In addition, it is desirable that limbs can be placed in natural poses.

Examples of mannequin joint structures in the prior art include those described in Ikeda (U.S. Pat. No. 5,180,086); Day (U.S. Pat. No. 5,098,213); Schoenhut (U.S. Pat. No. 982,096); Abbat (U.S. Pat. No. 5,257,873); Stringer (U.S. Pat. No. 4,630,762); Pansiera (U.S. Pat. No. 4,958,643); Kotlarsky and Gelman (U.S. Pat. No. 5,443,188); Bruce (U.S. Pat. No. 3,934,804); Strover and Strover (U.S. Pat. No. 5,967,790); Luke (U.S. Pat. No. 4,186,518); Miller (U.S. Pat. No. 4,955,844); Fogarty et al. (U.S. Pat. No. 5,308,276); Unalp and Kelley (U.S. Pat. No. 5,318,469); Glovier (U.S. Pat. No. 5,318,471); Toy (U.S. Pat. No. 4,545,514); Wiley et al. (U.S. Pat. No. 5,018,977); Jiang (U.S. Pat. No. 5,265,779); Neuschatz (U.S. Pat. No. 4,075,782); Breiden (U.S. Pat. No. 4,466,800); De Porteous (U.S. Pat. No. 5,044,960); Richards (U.S. Pat. No. 5,152,692); and Richards (U.S. Pat. No. 5,259,765).

A typical joint structure for mannequins uses a ball and socket connection means wherein a ball portion formed on a first limb member fits in and moves against the interior surface of a socket portion formed on a second limb member. The ball and socket are held in contact with each other by a locking mechanism, or fastener. Fastening the ball and socket together results in friction between the exterior ball surface and the interior socket surface. This friction allows the limbs to be placed and held in multiple positions.

One common type of fastener for a ball and socket joint is an eyehook-spring fixture where the spring and the eyehook are located on opposite sides of a bolt. The eyehook passes through a slot on the ball and is looped around a pivot-pin that is screwed into the center portion of the ball perpendicular to the long axis of the limb. The spring is threaded onto a rod that is located in the limb above the socket. Threading the spring onto the rod forces the ball and socket together, creating the friction used to position the limbs. The use of this type of fastener also results in the appearance of a gap on the ball portion of the joint at the slot and also permits movement of the limb having the ball portion to pivot, relative to the limb with the socket, by allowing the bolt to move through the slot.

Drawbacks of these types of prior art joints include:
1. The entire limb is assembled in one step, which can be awkward.
2. An unnatural looking slot, or gap, on the ball section of these joints.
3. Poor anatomical shape of the limb.

The joint of this invention defines an improvement over the prior art in that the disclosed joint eliminates the unnatural gap on the ball section of the limb. Further, novel fastening means simplifies production and assembly of joint structures and the assembly of mannequins and forms.

SUMMARY OF THE INVENTION

In its most general form, this invention provides a mannequin having removable, positionable limb members attached thereto comprising a joint to join two of the limb members together. The joints of this invention comprise one or more assembly fixtures, located within or on a limb member to be joined, that contain elements for joining limb members. The assembly fixtures may contain elements of a locking mechanism, or fastener, and may contain other elements for joining members or creating friction or tension between limb members to be joined. For example, a socket assembly fixture is positioned fixedly in the socket portion of a first member to be joined and comprises a chamber containing a tension-producing member and one half of a locking mechanism. A ball assembly fixture is positioned in the ball portion of a second member to be joined to said first member and comprises a second half of a locking mechanism, and means for attaching the second half of the locking mechanism to the ball portion of the second member to be joined. A joint structure is formed when two attachable limb members are joined together using one or more assembly fixtures.

This invention also provides methods for assembling the different embodiments of the joints and mannequins of this invention.

BRIEF DESCRIPTION OF THE DRAWINGS

FIG. 1 shows a mannequin of the invention with movable, detachable limbs.

FIG. 2 shows a socket assembly fixture of this invention. FIG. 2a is an exploded view. FIG. 2b shows a cross-sectional view of the fixture in FIG. 2a through b—b. FIG. 2c shows a top view of a portion of the socket assembly fixture of FIG. 2a.

FIG. 3 shows a ball assembly fixture of this invention. FIG. 3A is a side view of the ball assembly fixture. FIG. 3B shows a pivot pin. FIG. 3C shows a side view of the ball assembly fixture of FIG. 3A together with a pivot pin.

FIG. 4 shows an exploded view of the joint structure of this invention, used to join an upper leg with a lower leg.

FIG. 5 shows another embodiment of the joint structure of this invention at the wrist joint.

FIG. 6 shows a preferred embodiment of the joint structure of this invention at the wrist joint.

DETAILED DESCRIPTION OF THE INVENTION

Figure 1A:
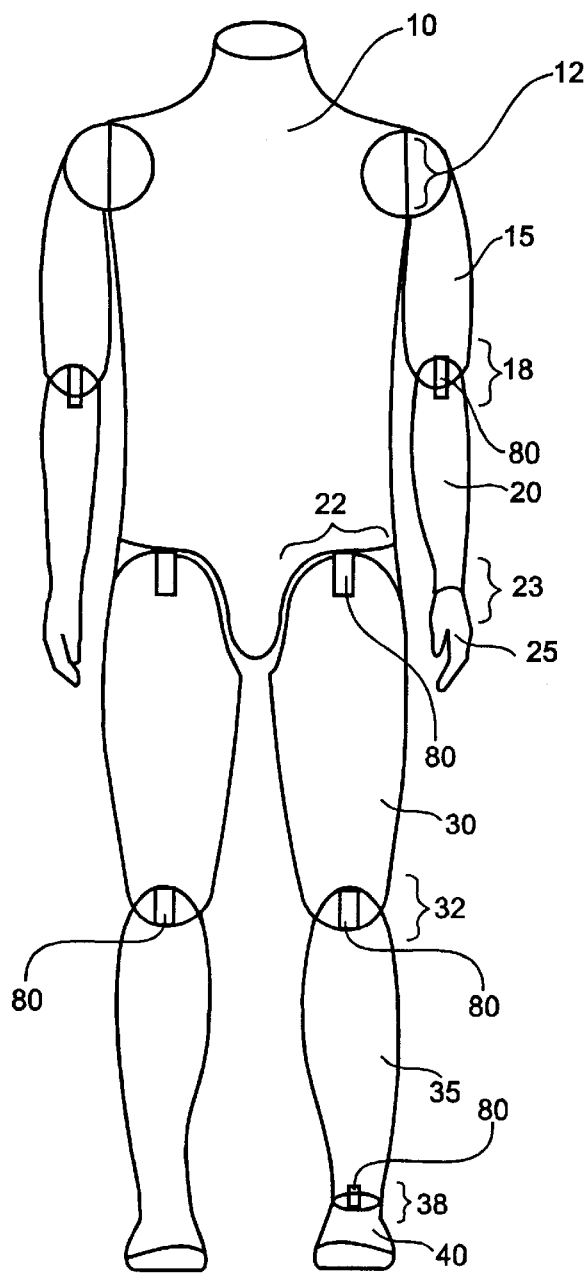
FIG. 1A shows a front view.

This invention describes novel joint structures for mannequins. In one embodiment of this invention, a joint structure is formed when a socket assembly fixture and ball assembly fixture are joined together.

For example, a socket assembly fixture is positioned fixedly in the socket portion of a first member to be joined and is comprised of a chamber containing a tension-producing member and one half of a locking mechanism. The tension-producing member may be made of any reversibly compressible material such as a spring, an elastomer, rubber, foam, or any other reversibly compressible material known in the art. Preferably, the tension-producing member is a spring. The locking mechanism can be a nut and bolt, a snap, a latch, dimples, a locking collar, or any other fastener or fastening means known in the art. Preferably, the locking mechanism is a threaded nut.

A ball assembly fixture is positioned in the ball portion of a second member to be joined to the first member and comprises a second half of a locking mechanism, and means for attaching the second half of the locking mechanism to the ball portion of the second member to be joined. Preferably, the second half of the locking mechanism is an eyebolt and the preferred means for attaching the eyebolt to the second member to be joined is via attachment to a disc. The disc may be molded with a groove on one of its flat surfaces to fixedly accept the eye portion of said eyebolt such that the eyebolt is held substantially in place relative to the disc surface. Alternatively, the eyebolt may be fixed to the disc using any means known in the art, including mechanical means and the use of adhesives.

The round disc is pivotally attached to the second member by any attachment means that allow the ball portion of the limb to pivot around the disc. Such attachment means are known in the art and include the use of a pivot pin and dimples. In a preferred embodiment, the attachment means is a pivot pin.

In another embodiment of this invention, a friction assembly fixture is recessed in the end of a first limb member to be joined, below the ball portion of the first limb member. A tab formed as part of, or attached to the socket surface of a second limb member, is inserted into the first limb member to contact the friction assembly fixture. The first and second members may be held in pivotal contact using any attachment means known in the art, including a pivot pin passing through both members and dimples. Preferably, a pivot pin is inserted through both fixtures, perpendicular to the limb axis, to hold the first and second limb members in contact.

The friction assembly fixture comprises a chamber with one end open to the attaching end of the first member. This chamber contains a reversibly compressible material in its bottom and a bearing on top of the reversibly-compressible material. This reversibly-compressible material can include elastic materials such as rubber, elastomers, foam, or other polymers, or may be a spring. Preferably the reversibly-compressible material is a spring. Also preferably, the spring is made of spring wire, also known as music wire or piano wire. The bearing may be made of any suitably rigid material, including plastics, metals, alloys, polymers, and the like. Preferably the bearing is made of plastic. More preferably the bearing is made of nylon.

The tab to be received by the friction assembly fixture may be molded as an integral part of the second limb member to be joined or it may be attached to the limb member using any attachment means known in the art, including adhesives, latches, clamps, pegs, or screws. Preferably, the tab is molded together with the second limb member to be joined. Optionally, one or more depressions, or pits, are present on the surface of the tab. In a preferred embodiment the first and second limb members are held together with a pivot pin passing through the end of the first member and the tab of the second member to be joined such that the tab contacts the bearing in the socket assembly fixture enough to compress the reversibly compressible material. The resulting friction between the two limb members allows them to bend relative to each other.

In another preferred embodiment, the tab has one or more recessed dimples on its surface. As the tab contacts the bearing in the socket, the bearing engages in a recessed dimple on the surface of the tab. By slidably positioning the tab relative to the bearing to engage different recessed dimples, the limbs are held in one or more positions.

Figure 1B:
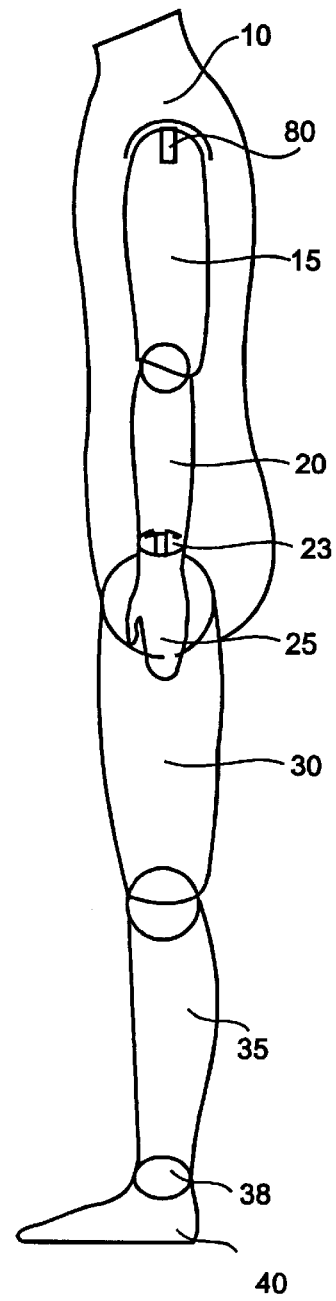
FIG. 1B shows a side view.

This invention also provides for a mannequin having the joints of this invention. "Mannequin" refers to human and/or animal shapes with or without heads, and with some or all appendages. The mannequins of this invention may have one or all of the joint structures described herein. FIG. 1A shows a front view of a mannequin or form of this invention with removable, freely movable, positionable, and adjustable limbs. Joint structures are present between the torso 10 and the upper arms 15 at the shoulder joint 12, between the upper arms 15 and the lower arms 20 at the elbow joint 18, between the lower arms 20 and the hands 25 at the wrist joint 23, between the torso 10 and the upper legs 30 at the hip joint 22, between the upper legs 30 and the lower legs 35 at the knee joint 32, and between the lower leg 35 and the feet 40 at the ankle joint 38. FIG. 1B is a side view of FIG. 1A.

FIG. 2A shows an exploded view of a preferred embodiment of socket assembly fixture 50. Socket assembly fixture 50 is located within a first limb member to be joined and adjacent to the molded socket surface of the first limb member (see FIG. 4B). Socket assembly fixture 50 consists of chamber 60 defining cavity 63. Cavity 63 may be any shape such as square, round, oval, triangular, and the like. Preferably chamber 60 is defined by four walls 68 and is square. Chamber 60 is attached by tack welding at the corners of chamber 60, or by other means known in the art, to the flat surface of washer 62, which is stamped with a recessed shape 61 (FIG. 2C) to match and receive one end of chamber 60. Washer 62 also has an opening 65 (FIG. 2C) in its center that has a diameter smaller than the diameter of spring 70 (FIG. 2A) so as to retain spring 70 within chamber. Spring 70 fits in chamber 60 in contact with washer 62. Nut 72, having threads 71 is positioned on top of washer 62 in chamber 60. Each wall 68 has a dimple 64 positioned on its surface such that the dimple is located above nut 72. Optional cap 75 fits on top of chamber 60 such that it closes cavity 63. FIG. 2B is a cross-sectional view of the socket assembly fixture 50 in FIG. 2A, through the axis b—b as it appears after assembly.

FIG. 3A shows a preferred embodiment of ball assembly fixture 55 in the ball portion of the limb members to be joined. Ball assembly fixture 55 consists of a disc 80 having surface 81, a groove (not shown) molded in surface 81, an edge surface 84 (FIG. 3C) and an opening 82 near the center of surface 81. Ball assembly fixture 55 also consists of an eyebolt 74 having threads 76 and a looped portion 78. The looped portion 78 of eyebolt 74 is positioned in the molded groove on surface 81 of disc 80.

FIG. 3B shows pivot pin 90 having a recessed middle portion 92 having a smaller diameter than the two outer portions 87 and 89 of pivot pin 90. Disc 80 is rotatably mounted on pivot pin 90 with the recessed middle portion 92 of the pin engaged upon and secured within opening 82 of disc 80. This is shown in FIG. 3C, a side view of FIG. 3A through c—c with pivot pin 90. The groove on surface 81 of disc 80 is positioned such that either none, some, or all of the inner surface of looped portion 78 of eyebolt 74 contacts recessed middle portion 92 of pivot pin 90 when assembled. Preferably, the groove is positioned such that a portion of the inner surface of looped portion 78 of eyebolt 74 contacts recessed middle portion 92 of pivot pin 90.

Figure 4A:
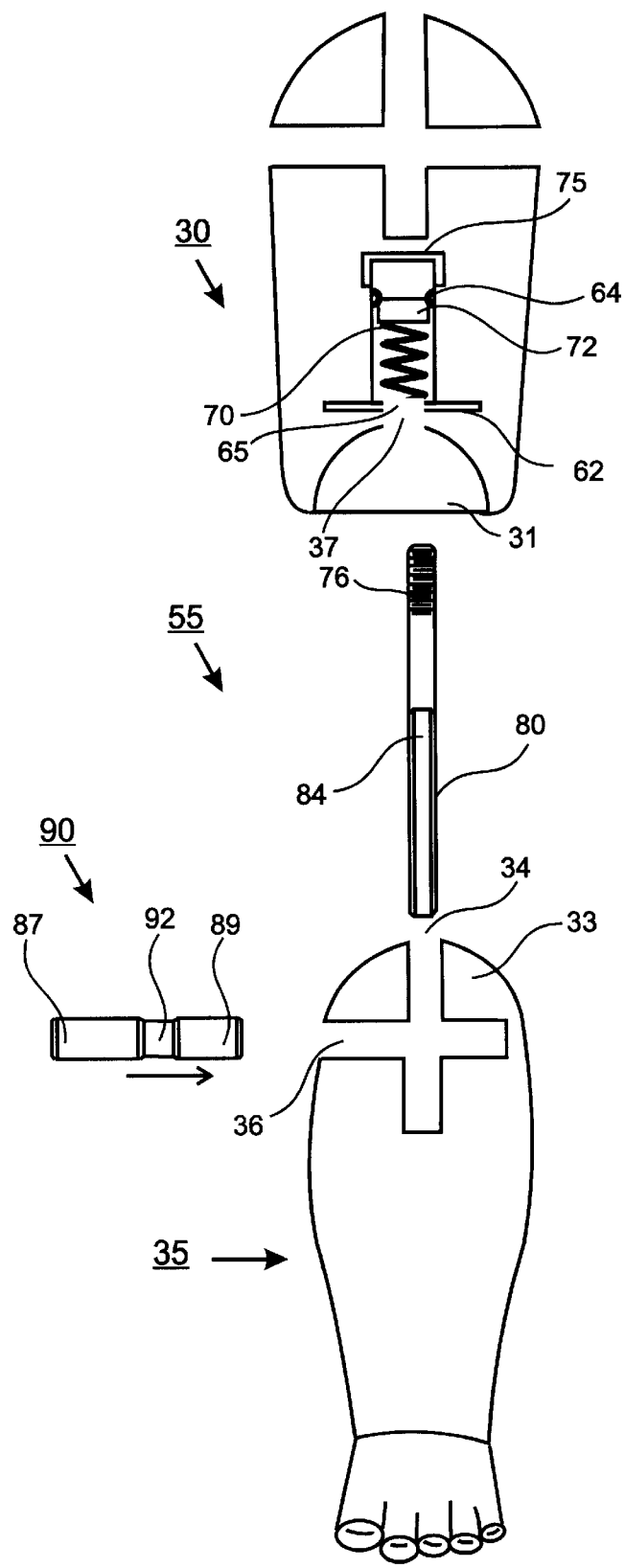
FIG. 4A is a front view.

FIG. 4A is an exploded view of the knee joint 32 used to join upper leg 30 and lower leg 35. Upper leg 30 has a socket 31 at its lower end with socket assembly fixture 50 recessed in the limb above the socket surface. Socket 31 has a hole 37 that is aligned with an opening 65 of washer 62. Lower leg 35 has a slot 34 extending into lower leg 35 from the center of the ball surface 33. Lower leg 35 also has a pin channel 36 that is perpendicular to and intersects with slot 34. Pin channel 36 may pass completely through lower leg 35 or may begin on either the lateral or medial side of lower leg 35 and pass only partially through lower leg 35. Preferably, pin channel 36 begins on the medial side of lower leg 35 and does not pass completely through to the lateral side of lower leg 35.

There are at least two methods of assembling the fastener to join the two limbs. In a first method for joining upper leg 30 and lower leg 35, the threaded portion 76 of eyebolt 74 (fixedly attached to disc 80) is inserted into socket hole 37 of upper leg 30 and opening 65 of washer 62 and passes through spring 70. Dimples 64 and/or cap 75 retain nut 72 within chamber 60. The eyebolt threads 76 are coupled with threads 71 of the nut 72 (FIG. 2A) of socket assembly fixture 50. Joining these threads together pulls nut 72 towards the socket 31 and puts tension on spring 70. Next, the disc 80 of ball fixture assembly 55 is inserted into slot 34 of lower leg 35 so that disc opening 82 is aligned with pin channel 36 on lower leg 35 (FIG. 2a). Finally, pivot pin 90 is inserted into pin channel 36 on lower leg 35 so that recessed portion 92 of the pivot pin 90 is located within and engages with opening 82 in the disc 80. Thus engaged, pivot pin 90 is securely centered in disc 80. Alternatively, lower leg 35 and ball fixture assembly 55 can be assembled as above prior to joining socket assembly fixture 50 with ball assembly fixture 55.

Figure 4B:
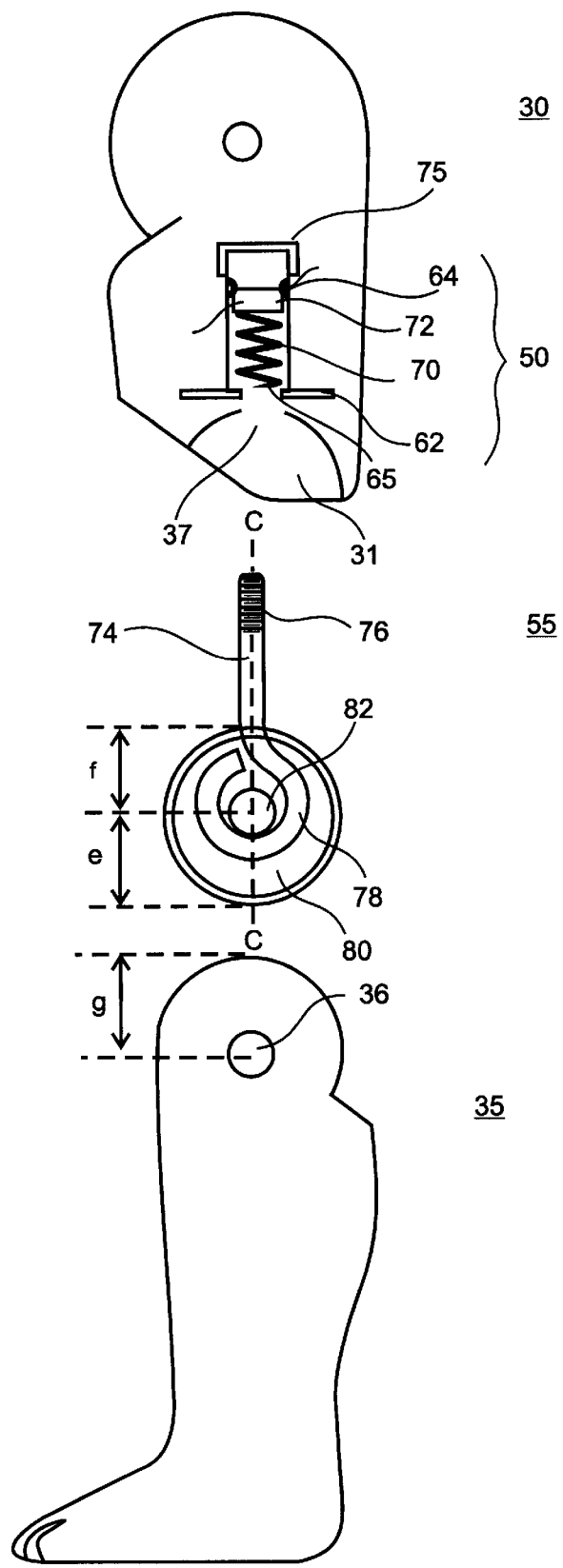
FIG. 4B is a side view.

Once upper leg 30 is joined to lower leg 35, lower leg 35 is free to rotate about the axis c—c defined by eyebolt 74 (FIG. 4B), and can also pivot about pivot pin 90. Also, disc 80 effectively fills the gap found in prior art joints in which a spring-topped eyebolt only (no disc) is used to pivotally attach a ball limb member to a socket limb member. Preferably, the distance 'f' on disc 80 is slightly smaller than the dimension 'e' on disc 80 and diameter 'g' of the ball portion of the limb (FIG. 4B). This allows the ball surface 33 to fully contact the socket surface 31, which in turn results in greater friction between the two limb members than if only the disc edge surface 84 (FIG. 3C) contacted the socket surface. This allows the limbs to be more easily held in a variety of positions. Preferably, the difference between distances f and g is between 0.100 and 0.010 inches. More preferably, the difference is between 0.060 and 0.020 inches. Most preferably, the difference is 0.040 inches.

Figure 5A:
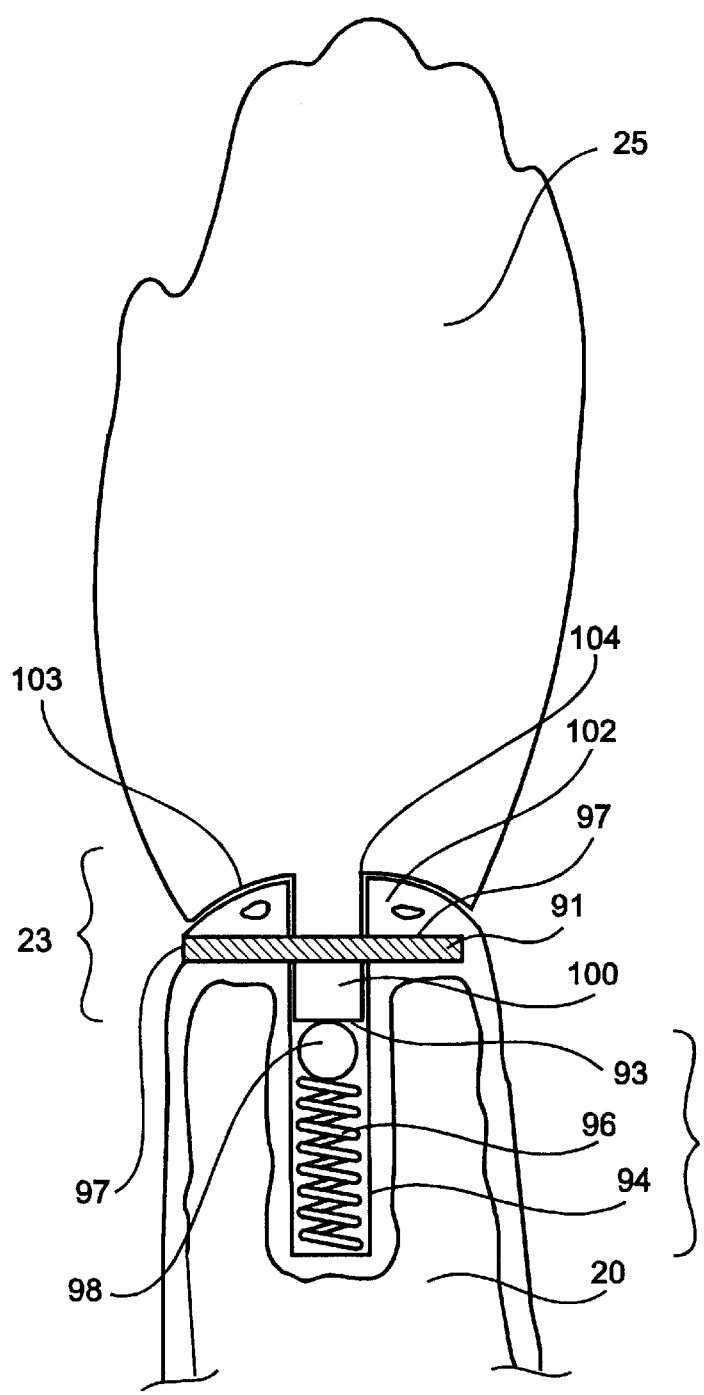
FIG. 5A is a top view cross-section.
Figure 5B:
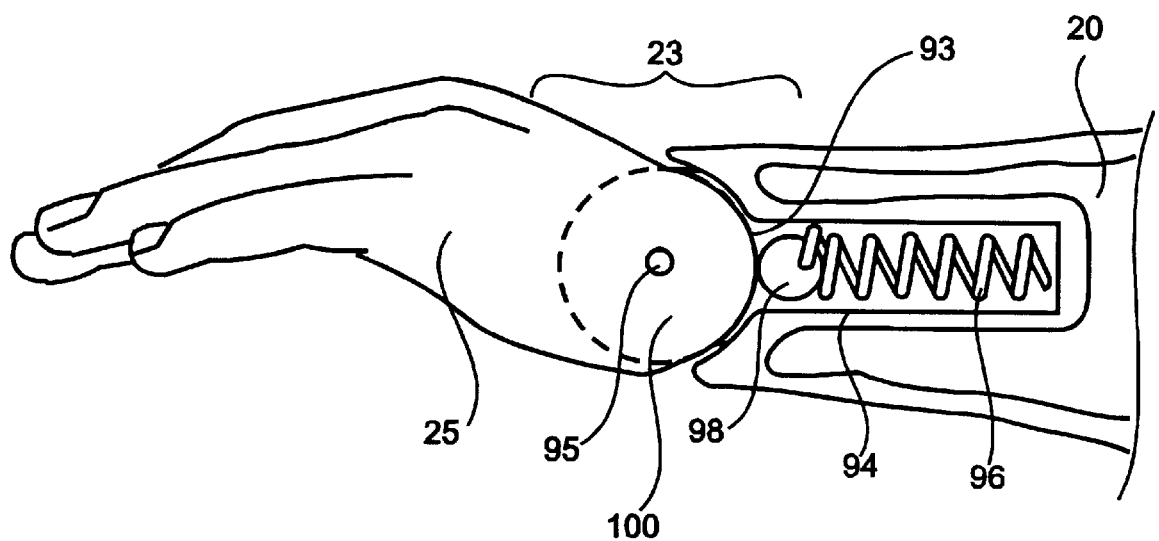
FIG. 5B is a side view cross-section.

Another embodiment of this invention is shown in FIGS. 5A and 5B, which illustrate a top view cross-section and a side view cross-section, respectively, of wrist joint 23 between lower arm 20 and hand 25. In this embodiment, lower arm 20 provides the ball portion 102 of the ball and socket connection means and hand 25 provides the socket portion 103 of the ball and socket connection means.

Figure 6A:
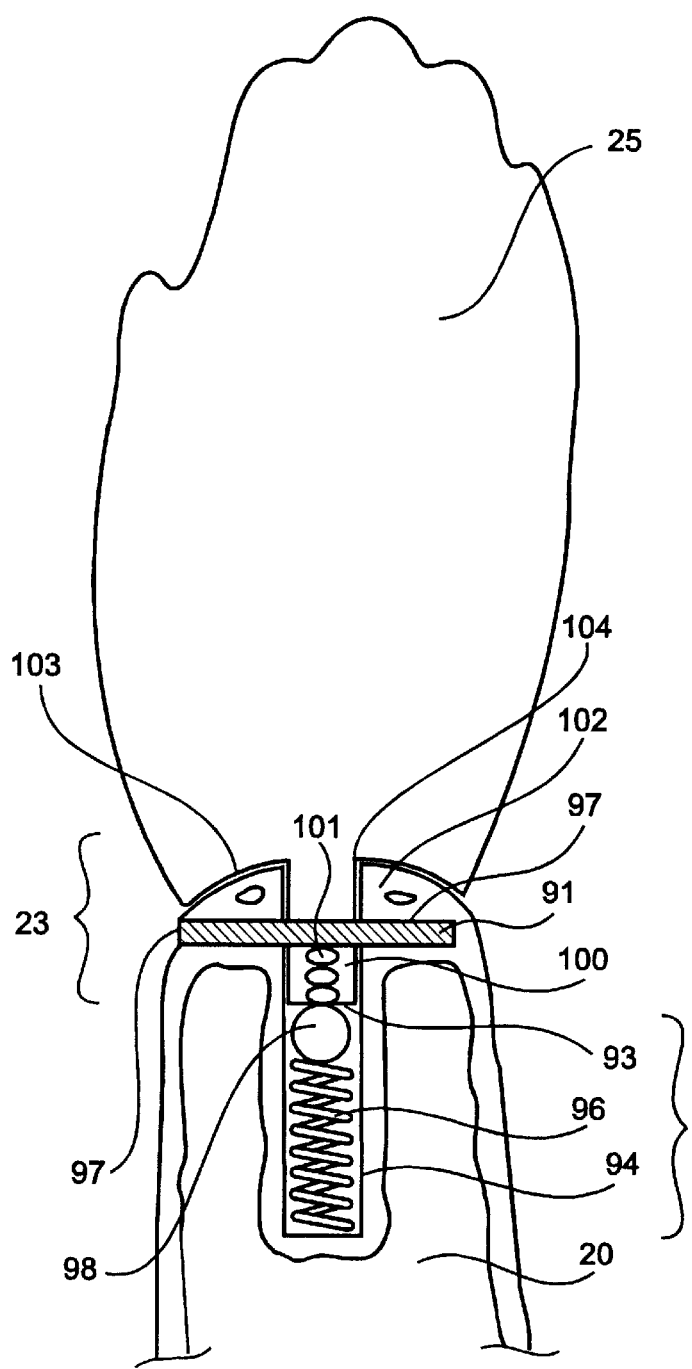
FIG. 6A is a top view cross-section.
Figure 6B:
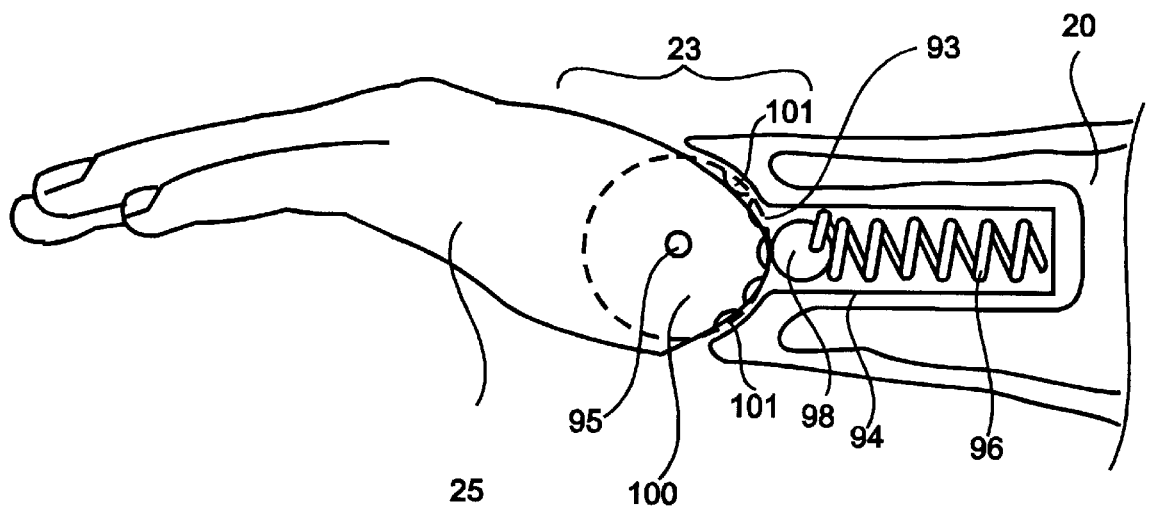
FIG. 6B is a side view cross-section.

Referring to FIG. 5A, lower arm 20 has a chamber 94 extending into the center of lower arm 20 below the slit 104 of the ball portion 102. Chamber 94 contains a friction-producing assembly fixture 105, said friction-producing assembly fixture consisting of a spring 96 and a bearing 98 positioned on top of spring 96. Ball portion 102 of lower arm 20 also has a cavity 97 that is perpendicular to the long axis of chamber 94. Hand 25 has tab 100 fixedly attached to the interior surface of its socket portion 103. Tab 100 also has a center hole 95 (FIG. 5B). Optionally tab 100 has one or more surface depressions 101 (FIGS. 6A and 6B).

To assemble the wrist joint, tab 100 is inserted into slit 104 such that center hole 95 lines up with cavity 97. With center hole 95 and cavity 97 aligned, wrist pin 91 is inserted into cavity 97 and through center hole 95 to secure hand 25 to lower arm 20. Further, when tab 100 is thus secured in chamber 94, its lower surface 93 contacts bearing 98. The resulting tension in spring 96 causes the bearing 98 to push up against the lower surface 93 of tab 100. This pressure causes friction between tab 100 and wrist pin 91 that allows the limbs to be placed in a variety of positions. Alternatively, bearing 98 registers with the optional tab surface depressions 101 to afford additional control over limb position (FIGS. 6A and 6B). As seen in the previous embodiment, tab 100 also effectively fills the joint gap found in prior art joints.

Throughout this specification, the term "limb member" refers to any movable members of a form and includes but is not limited to: head, neck, torso, upper and lower arms, hands, fingers (including all digits), upper and lower legs, feet, and toes (including all digits). The term "joint" refers to all the joints that commonly connect limb members and allow their relative movement and includes neck, shoulder, wrist, hip, knee, torso, ankle, and fingers and toes. The term "medial" refers to positions towards the center, or mid-line of the body, while the term "lateral" refers to positions towards the side of the body, opposite the medial position.

The present invention is not to be limited by the preferred embodiments described herein. Upon reading this specification, those skilled in the art will recognize various modifications thereof. Therefore, it is to be understood that such modifications are intended to fall within the scope of the appended claims.

All references cited herein are incorporated in their entirety to the extent that they are not inconsistent with the disclosure herein.

We claim:

1. A joint structure for attaching and positioning limb members of a mannequin comprising:
   a first assembly fixture positioned fixedly in a socket portion of a first limb member to be joined, said first assembly fixture comprising:
   a tension-producing member; and
   a first half of a locking mechanism in contact with said tension-producing member; and
   a second assembly fixture positioned in a ball portion of a second limb member adapted to be joined to said first limb, said second assembly fixture comprising:
   a disc pivotally attached to said second limb member; and
   a second half of said locking mechanism fixedly attached to said disc wherein said ball portion of said second limb member has a slot formed therein and said disc is inserted into and effectively fills said slot.

2. The joint structure of claim 1 wherein the tension-producing member comprises a reversibly-compressible material.

3. The joint structure of claim 2 wherein the reversibly compressible material is a spring.

4. The joint structure of claim 3 wherein the first half of said locking mechanism comprises a threaded nut.

5. The joint structure of claim 4 wherein the second half of said locking mechanism comprises a threaded bolt.

6. The joint structure of claim 5 wherein the threaded bolt is an eyeholt.

7. The joint structure of claim 1 wherein said disc is pivotally attached to said second limb by means of a pivot pin extending through said disc and said second limb.

8. The joint structure of claim 7 wherein said pivot pin enters said second limb on the medial side of said second limb and does not exit the lateral side of the second limb.

9. The join structure of claim 8 wherein a middle portion of said pivot pin has a smaller diameter than end portions of said pivot pin.

10. The joint structure of claim 9 wherein the diameter of the disc is such that the disc does not contact the socket portion of the first member to be joined.

11. The joint structure of claim 1 wherein the attachable members are selected from the group consisting of a torso, an arm, an upper arm, a lower arm, a head, a pelvis, a leg, an upper leg, a lower leg, a foot, a hand, a finger and a toe.

12. A mannequin comprising a joint 1.

13. The mannequin of claim 12 wherein said joint is selected from the group consisting of a neck, a shoulder, a wrist, an elbow, a hip, a torso, a knee, a finger, a toe, and an ankle.

14. The joint structure of claim 1 comprising:
   a first assembly fixture positioned fixedly in a socket portion of a first limb member to be joined, said first assembly fixture comprising:
      a spring; and
      a threaded nut in contact with said spring; and
   a second assembly fixture pivotally attached to a ball portion of a second limb member adapted to be joined to said first limb, said second assembly fixture pivotally attached to said ball portion, and said second assembly fixture comprising:
      a disc pivotally attached to said second limb member by means of a pivot pin extending through said disc and said ball portion; and
      a threaded eyebolt fixedly attached to said disc by means of a groove molded therein to fixedly accept an eyeportion of the eyebolt.

15. The joint structure of claim 14 wherein the attachable members are selected from the group consisting of a torso, an arm, an upper arm, a lower arm, a head, a pelvis, a leg, an upper leg, a lower leg, a foot, a hand, a finger and a toe.

16. A mannequin comprising a joint of claim 14.

17. The mannequin of claim 16 wherein said joint is selected from the group consisting of a neck, a shoulder, a wrist, an elbow, a hip, a torso, a knee, a finger, a toe, and an ankle.

18. A joint structure for attaching and positioning limb members of a mannequin comprising:
   a first assembly fixture positioned fixedly in a socket portion of a first limb member to be joined, said first assembly fixture comprising:
      a tension-producing member: and
      a first half of a locking mechanism in contact with said tension-producing member; and
   a second assembly fixture positioned in a ball portion of a second limb member adapted to be joined to said first limb, said second assembly fixture comprising:
      a disc pivotally attached to said second limb member; and
      a second half of said locking mechanism fixedly attached to said disc
wherein the tension-producing member comprises a spring, the first half of said locking mechanism comprises a threaded nut, the second half of said locking mechanism comprises an eyebolt and said disc comprises a groove molded Therein to fixedly accept an eve-portion of the eyebolt.

19. A method of assembling a joint structure comprising:
   providing a first limb member to be joined said first limb member having a socket portion formed on the limb end to be joined,
   providing a first assembly fixture adapted to be positioned fixedly in said socket portion of the first limb member, said first assembly fixture comprising:
      a tension-producing member; and
      a first half of a locking mechanism in contact with said tension-producing member;
   providing a second limb member to be joined said second limb member having a ball portion at its joining end and a slot formed therein;
   providing a second assembly fixture adapted to be positioned in a ball portion of the second limb member comprising:
      a disc; and
      a second half of said locking mechanism fixedly attached to said disc; joining said first and second halves of said locking mechanism; sliding said disc into the slot on the second limb member; and
   securing the disc to the second limb member wherein said disc effectively fills said slot.

20. A method of assembling a joint structure comprising:
   providing a first limb member to be joined, said first limb member having a socket portion formed on the limb end to be joined;
   providing a first assembly fixture adapted to be positioned fixedly in the socket portion of the first limb member, said first assembly fixture comprising:
      a tension-producing member; and
      a first half of a locking mechanism in contact with said tension-producing member;
   providing a second assembly fixture comprising
      a disc; and
      a second half of said locking mechanism fixedly attached to said disc;
   providing a second limb member to be joined, said second limb member having a ball portion at its joining end and a slot in said ball portion to accept said disc;
   sliding said disc into the slot on the bail portion of the second limb member; securing the disc to the second limb member; and
   joining said first and second halves of said locking mechanism wherein said disc effectively fills said slot.

21. A method of assembling a joint structure comprising:
   providing a first limb member to be joined said first limb member having a socket portion formed on the limb end to be joined;
   providing a first assembly fixture adapted to be positioned fixedly in said socket portion of the first limb member, said first assembly fixture comprising:
      a washer having an opening;
      a chamber in contact with said washer;
      a spring positioned within said chamber wherein the spring is in contact with the washer and aligned with the washer opening;
      a threaded nut positioned within said chamber wherein the threaded nut is in contact with and aligned with the spring and;
      an end-cap;
   providing a second limb member to be joined said second limb member having a ball portion at its joining end and a slot formed therein;
   providing a second assembly fixture adapted to be positioned in a ball portion of the second lint member comprising:
      a disc and;
      a threaded eyebolt fixedly attached to said disc;

passing the eyebolt through the opening of the first limb member, the washer and the spring;

threading the eyebolt into the threaded nut;

sliding said second assembly fixture into the slot on the second limb member; and securing the second assembly fixture to the second limb member.

22. A method of assembling a joint structure comprising:

providing a first limb member to be joined, said first limb member having a socket portion formed on the limb end to be joined;

providing a first assembly fixture adapted to be positioned fixedly in the socket portion of the first limb member, said first assembly fixture comprising:
  a washer having an opening;
  a chamber in contact with said washer;
  a spring positioned within said chamber wherein the spring is in contact with the washer and aligned with the washer opening
  a threaded nut positioned within said chamber wherein the threaded nut is in contact with and aligned with the spring and; an end-cap;

providing a second assembly fixture comprising
  a disc; and
  a threaded eyebolt fixedly attached to said disc;

providing a second limb member to be joined, said second limb member having a ball portion at its joining end and a slot in said ball portion to accept said disc;

sliding said second assembly fixture into the slot on the ball portion of the second limb member;

securing the second assembly fixture to the second limb member;

passing the eyebolt through the opening of the first limb member, the washer and the spring; and threading the eyebolt into the threaded nut.

* * * * *

UNITED STATES PATENT AND TRADEMARK OFFICE
CERTIFICATE OF CORRECTION

PATENT NO. : 6,659,315 B2  Page 1 of 1
DATED : December 9, 2003
INVENTOR(S) : Talaric et al.

It is certified that error appears in the above-identified patent and that said Letters Patent is hereby corrected as shown below:

<u>Title page, Item [54] and Column 1, line 1,</u>
Title, please delete "MANIKIN" and replace with -- MANNEQUIN --.

<u>Column 6,</u>
Line 64, please delete "eyeholt" and replace with -- eyebolt --.

<u>Column 7,</u>
Line 4, please delete "join" and replace with -- joint --.
Line 13, please delete "1" and replace with -- of claim 1 --.
Line 62, please delete "Therein" and replace with -- therein --.
Line 62, please delete "eve" and replace with -- eye --.
Line 67, please delete "joined," and replace with -- joined; --.

<u>Column 8,</u>
Line 38, please delete "bail" and replace with -- ball --.
Line 64, please delete "lint" and replace with -- limb --.

Signed and Sealed this

Twenty-third Day of March, 2004

JON W. DUDAS
*Acting Director of the United States Patent and Trademark Office*